Figure 3:
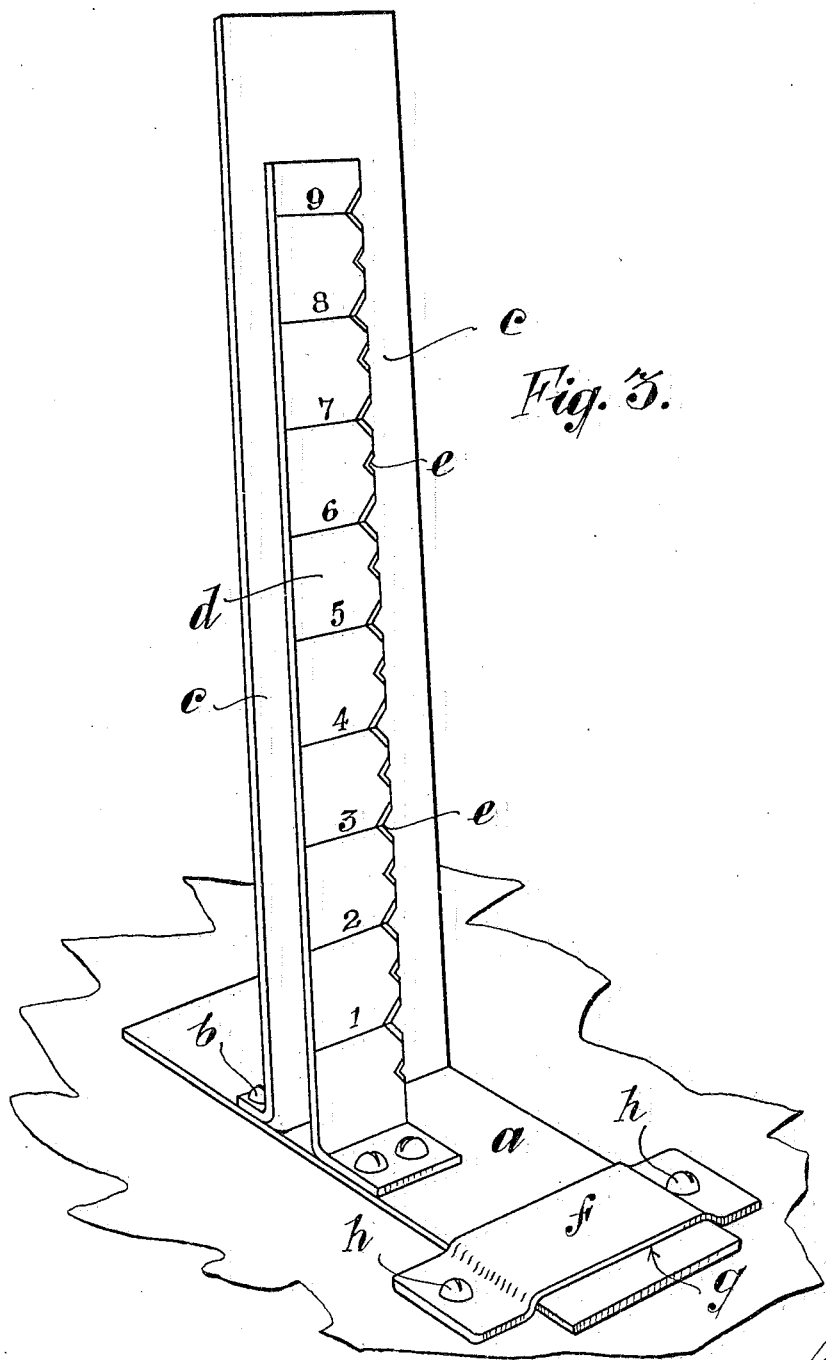

No. 809,669. PATENTED JAN. 9, 1906.
S. D. CHEYNE.
APPARATUS FOR MEASURING AND MARKING THE DISTANCE FROM THE GROUND OF SKIRTS, &c.
APPLICATION FILED OCT. 10, 1905.
2 SHEETS—SHEET 1.
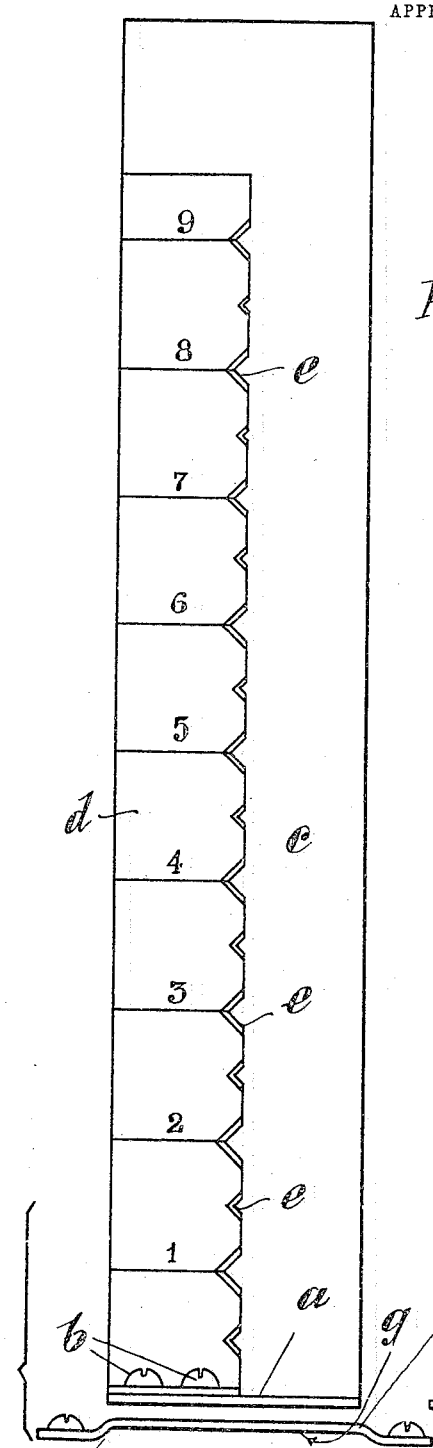
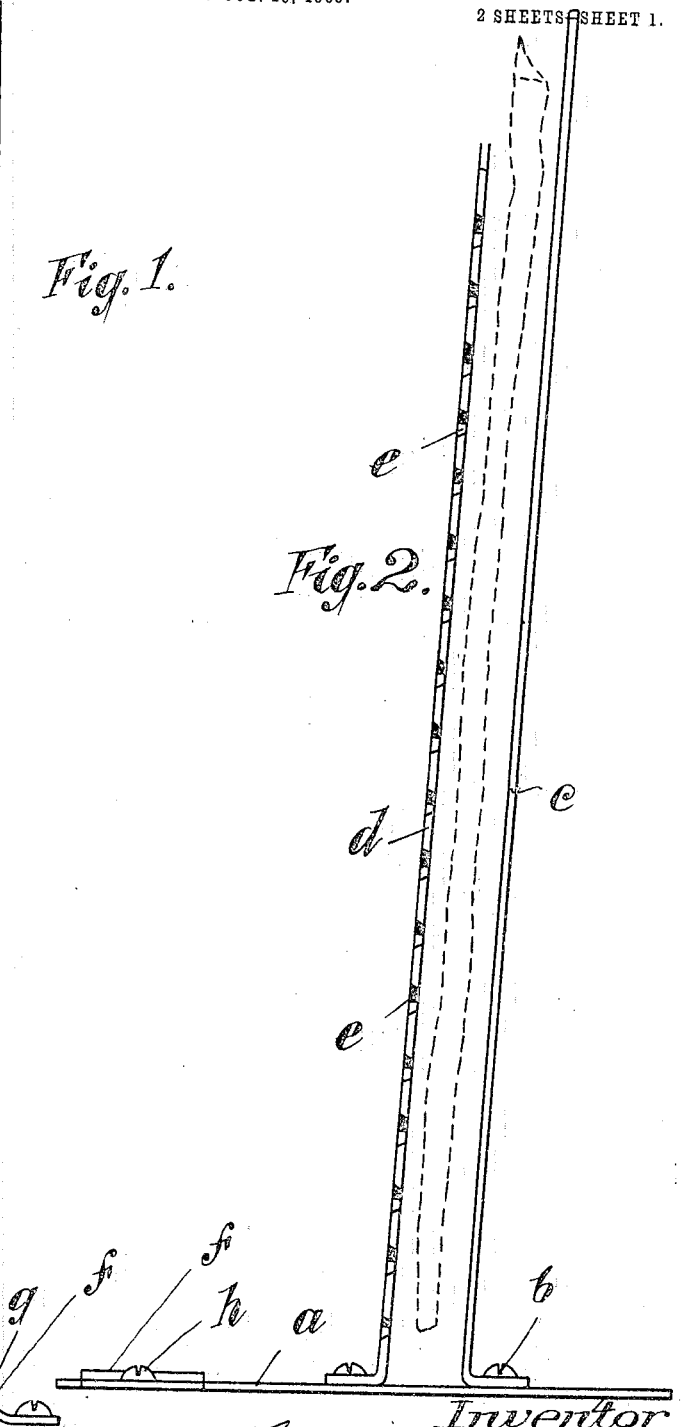

No. 809,669. PATENTED JAN. 9, 1906.
S. D. CHEYNE.
APPARATUS FOR MEASURING AND MARKING THE DISTANCE FROM THE GROUND OF SKIRTS, &c.
APPLICATION FILED OCT. 10, 1905.

2 SHEETS—SHEET 2.

Witnesses:
P. F. Nagle.
L. Douville.

Inventor:
Samuel Donald Cheyne.
By Wildersheim & Fairbanks
Attorneys.

UNITED STATES PATENT OFFICE.

SAMUEL DONALD CHEYNE, OF BELFAST, IRELAND.

APPARATUS FOR MEASURING AND MARKING THE DISTANCE FROM THE GROUND OF SKIRTS, &c.

No. 809,669.　　　　Specification of Letters Patent.　　　Patented Jan. 9, 1906.

Application filed October 10, 1905. Serial No. 282,091.

*To all whom it may concern:*

Be it known that I, SAMUEL DONALD CHEYNE, ladies' tailor, a subject of the King of Great Britain, residing at 6 Wellington Place, Belfast, Ireland, have invented an Apparatus for Measuring and Marking the Distance from the Ground of Skirts and other Garments, of which the following is a specification.

This invention relates to an apparatus for measuring and marking the distance from the ground of skirts and other garments; and it has for its object to provide a simple and efficient apparatus for that purpose.

In order that my said invention may be properly understood, I have hereunto appended an explanatory sheet of drawings, whereon—

Figure 1 is a front elevation, Fig. 2 a side elevation, and Fig. 3 a perspective view, of one construction of my improved apparatus.

Referring to the drawings, the apparatus preferably consists of a base $a$, of wood, metal, or other suitable substance, to which is secured, by means of screws $b$, or in any other suitable manner, an upright $c$, which may also be made of wood, metal, or other suitable substance. A second upright $d$ is also secured to the base $a$ in a similar manner to the upright $c$ and is shown situated a short distance in front of same. This second upright, which serves the purpose of a gage, is preferably divided off into one-inch spaces, which again may be subdivided into one-half-inch spaces. Each of these spaces is provided with a notch or the like $e$, which serves as a rest or guide for the chalk used in marking the skirt or other garment.

In order to temporarily secure the apparatus to the floor whenever desired, a floor-strap $f$ is used. This strap, which is made with a raised central part $g$, through which the base $a$ can be pushed, is secured to the floor by means of screws or the like $h$. The strap $f$ may remain permanently attached to the floor, so that whenever it is desired to use the apparatus it can be temporarily secured in position by pushing the base $a$ through the raised central part $g$ of the floor-strap.

When the apparatus is in use, the lower part of the skirt being fitted rests between the uprights $c$ and $d$, as shown in dotted lines at Fig. 2, and by resting the usual marking-chalk in the notch the desired distance from the ground and pressing the chalk against the skirt a mark is made thereon.

Having now fully described my invention, what I claim, and desire to secure by Letters Patent, is—

1. An apparatus for measuring and marking the distance from the ground of skirts and other garments consisting of a base to which two uprights are fitted at a short distance apart from one another, one of said uprights being marked off with divisions and provided with notches in which the chalk or the like can be rested when marking the garment, substantially as described.

2. An apparatus for measuring and marking the distance from the ground of skirts and other garments comprising, in combination a base, two uprights fitted to the base and situated a short distance apart from one another, one of said uprights being marked off with divisions and provided with notches in which the chalk or the like can be rested when marking the garment, substantially as described.

In testimony whereof I affix my signature in presence of two witnesses.

SAMUEL DONALD CHEYNE.

Witnesses:
　EDWARD HARVEY,
　WM. A. HARRIS.